UNITED STATES PATENT OFFICE.

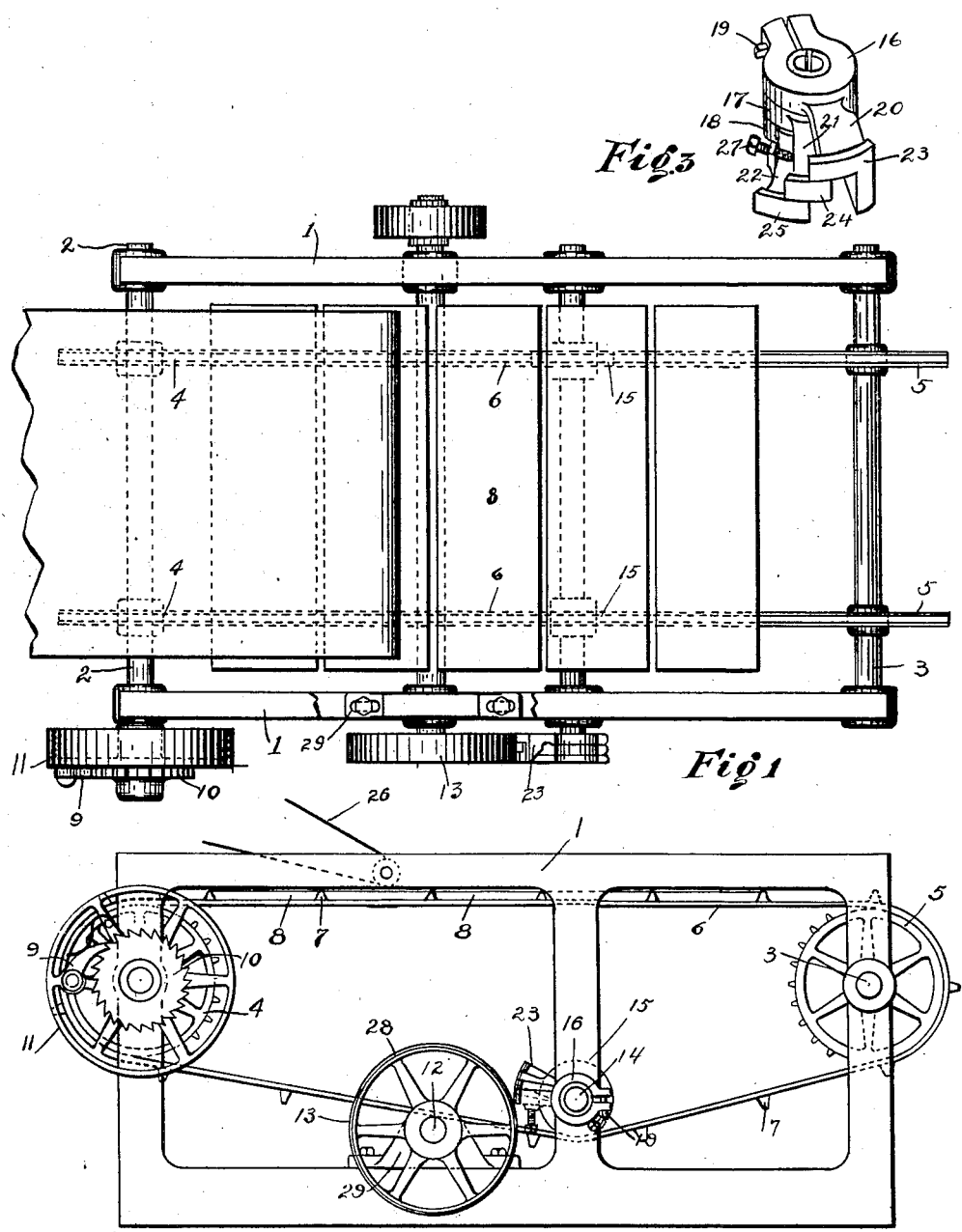

ALBERT BLEILE, OF DAYTON, OHIO.

PAN-SKIPPING DEVICE FOR CRACKER-CUTTING MACHINES.

No. 863,349.      Specification of Letters Patent.      Patented Aug. 13, 1907.

Application filed February 4, 1907. Serial No. 355,635.

*To all whom it may concern:*

Be it known that I, ALBERT BLEILE, a citizen of the United States, residing in Dayton, county of Montgomery, and State of Ohio, have invented certain new and useful Improvements in Pan-Skipping Devices for Cracker-Cutting Machines, of which the following is a full, clear, and exact description, reference being had to the accompanying drawings, forming part of this specification.

My invention relates to devices for the delivery of bakers' goods shaped in molds or cut from a continuous sheet of dough, or otherwise formed, in which the cut dough is delivered continuously into pans, in which it is desired to give an intermittent accelerated movement to the traveling carriage, upon which the pans for the reception of the goods are presented to the machine.

It is customary in cracker and the like machines to deliver continuously the goods cut from the sheet of dough by the cutters or dies, or otherwise formed, to the pans, which are presented in succession at the point of delivery, and these pans are usually carried to and away from the delivery point by traveling belts or aprons. As the goods are delivered continuously, if the pans are fed with uniform speed, the material would be deposited not only in the pans, but on the edges, and in the space between the pans. It is, therefore, necessary to provide some means to accelerate the movement of the pans as each is filled, so that the material shall only be deposited in the proper position on the pans, otherwise all the material that is improperly distributed has to be gathered as scrap, and again mixed with the mass of dough to be again formed into sheets, and cut by the machine.

It is the purpose of my invention to provide a simple, cheap and effective construction to obtain this acceleration of movement at the proper times, by that novel construction and arrangement of parts to be hereinafter particularly pointed out and claimed, whereby the device may be readily and easily adjusted for any desired speed of the cracker delivery mechanism, and in which the amount of skip or acceleration may be also readily adjusted for the space between the pans and other conditions that may arise.

In the drawings Figure 1 is a plan view of the pan carrier embodying my improvements. Fig. 2 is a side elevation of same and Fig. 3 is a perspective view of the accelerating device.

I have only illustrated in the drawings the delivery end of the cracker cutting machine, as the construction of machine for cutting the material in the proper shapes from a sheet of dough forms no part of my present invention.

In the drawings 1—1 represents the side standards or continuation of the framework of the cracker machine, suitably braced and held together by cross braces. 2 and 3 are shafts journaled one at each end of this portion of the frame work, and the shaft 2 carries keyed thereto the pair of sprocket wheels 4, 4 spaced a convenient distance apart, while 5, 5 are similar sprockets either loosely mounted on or keyed to turn with the shaft 3, and spaced the same distance apart as the sprockets 4, 4. These sprocket wheels carry the sprocket chains 6, 6, which are provided at proper intervals with lugs 7, and the shallow pans 8—8 for holding the goods are placed to rest at each end on the chains 6—6 to be carried forward away from the machine by the lugs 7—7 as the sprocket wheels are actuated to feed the chains. Instead of merely resting the shallow pans on the sprocket chains, an apron or other flexible carrier may be provided between the sprocket chains, or other driving means, and the pans rested on the apron, and carried forward by lugs or transverse strips.

10 is a ratchet wheel mounted on the shaft 2, and engaged by a pawl or dog 9, which is mounted on the pulley 11, driven by belt or train of gears from the main driving power of the machine, by means of which pawl and ratchet the shaft 2 and the pair of sprockets 4—4 will be driven at any desired speed to actuate the sprocket chains for feeding the pans 8—8 in succession to and away from the delivery end of the machine. 12 is a shaft journaled across the lower portion of the framework carrying the pulley 13, and this shaft and pulley is driven by any suitable gearing or pulley connection with the main driving mechanism of the machine, or other driving power, at a greater rate of speed than the sprocket wheels 4 and 5.

14 is a shaft journaled across the lower portion of the framework carrying sprocket wheels 15, whose circumference is the distance between the centers of two succeeding pans, and these sprockets 15 are in engagement with the sprocket chains 6, so that with each rotation of the sprocket 15, the pans will have moved the distance between their centers.

Mounted on the shaft 14 in such a position as to engage the face of the pulley 13 is the accelerating device which consists of a plurality of hubs 16, 17 and 18, which are split and arranged to be held and tightened on the shaft 14 by the set screws 19, and each of these hubs is provided with an arm 20, 21, and 22, with a segmental bearing face 23, 24 and 25. The bearing face 23 is made the entire width of the hubs, and corresponds with the width of the face of the pulley 13.

The accelerating device is so mounted on the shaft 14, that with each rotation of the shaft the faces of the devices will come in contact with the face of the pulley 13, and by this frictional contact the rotation of the shaft 14, and of the sprocket 15 will be accelerated, and the sprocket chains 6—6 will thus be accelerated in their movement during the time the accelerating device is in contact with the pulley 13. The device is so adjusted on the shaft 14, that the commencement of the accelerated movement shall occur just before the rear edge of the pans pass the deliver point of the material from the cracker machine. In the drawings I have shown the end of a belt or apron 26 for thus delivering the cut crackers continuously to the pans.

The face 23 of the accelerating device is made the full width of the pulley face in order to insure the friction clutch between the parts, and the length of time this clutch shall continue can be very readily and easily adjusted by the set screws 27 to correspond with the space between the rear edge of one pan and the front edge of the next succeeding pan.

In order to insure a more perfect clutch between the pulley 13 and the accelerating device, the pulley face is covered with leather 28, or other suitable material, and the shaft 14 is mounted in adjustable bearings 29, so that it may be adjusted towards or away from the shaft 12, in order to increase or diminish the friction contact of the pulley 13 with the accelerating device or to throw it out of engagement altogether.

Having thus described my invention, what I claim as new, and desire to secure by Letters Patent, is:—

1. In a cracker machine, the combination, with an endless carrier for presenting pans in succession to the machine, of two rotating members, one in communication with said endless carrier, and the other driven independently at a higher rate of speed, segmental contact piece on the carrier rotating member, contacting with the independent rotary member, with each rotation of the carrier member to accelerate the speed of the endless carrier.

2. In a cracker machine, the combination, with an endless carrier for presenting pans in succession to the machine, of two rotating members, one in communication with said endless carrier, and the other driven independently at a higher rate of speed, segmental contact piece on the carrier rotating member, comprising a plurality of contact faces adjustable with reference to each other to increase or diminish the length of the segment, said contact piece contacting with the independent rotary member with each rotation of the carrier member.

3. In a cracker machine, the combination, with an endless carrier for presenting pans in succession to the machine, of two rotating members, one having a circumference equal to the distance between the centers of successive pans on said endless carrier, and driven circumferentially by said carrier, and the other rotary member driven independently at a higher rate of speed, with clutch intermediate said rotary members, whereby the speed of the endless carrier may be intermittently accelerated.

4. In a cracker machine, the combination, with an endless carrier comprising sprocket chains and sprocket wheels for driving same to present pans in succession to the machine, of a sprocket wheel whose circumference is equal to the distance between the centers of successive pans on said carrier, in engagement with said sprocket chains, and a pulley driven independently at a higher rate of speed than said sprocket, said sprocket carrying a segmental face to contact with said pulley with each sprocket rotation whereby the speed of the sprocket and endless carrier may be accelerated.

ALBERT BLEILE.

Witnesses:
JOSEPH W. GREEN,
WESTON GREEN.